G. Sanford,
Horse Power.
N° 25,528.      Patented Sep. 20, 1859.
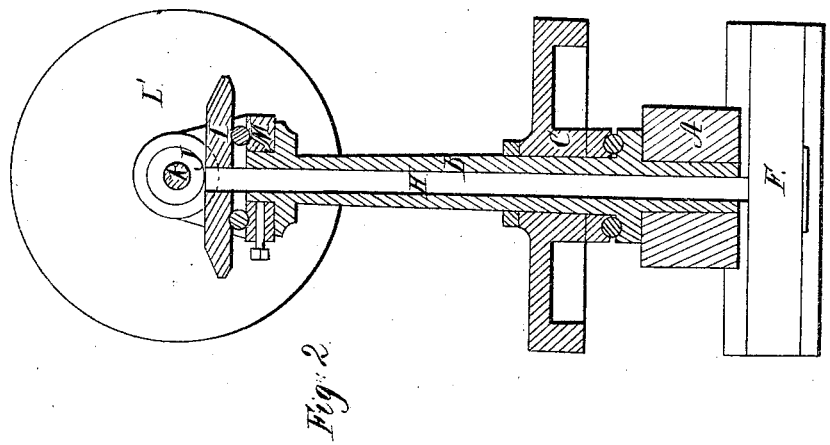
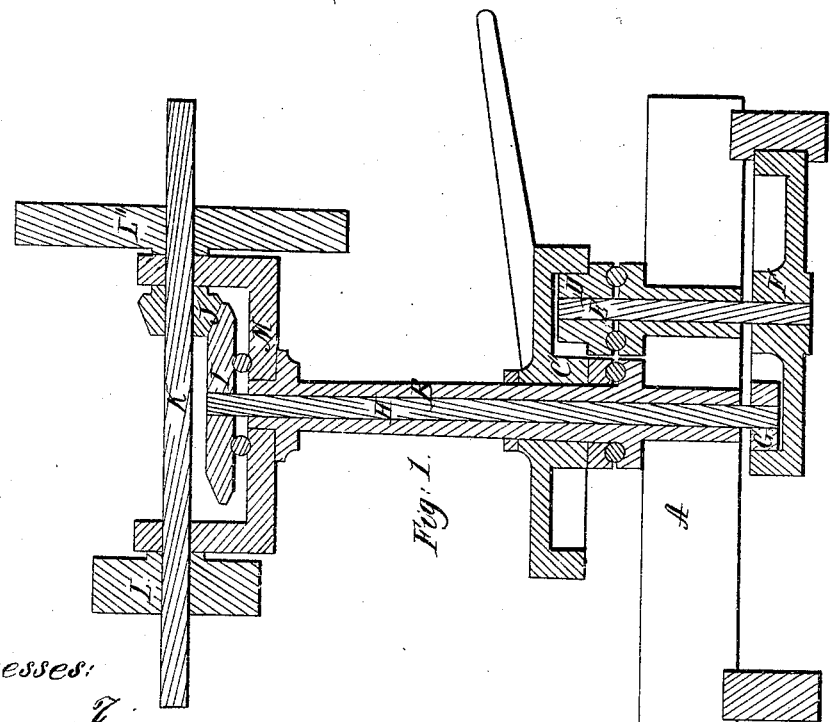
Witnesses:
Thomas Finn
M Haskell.
Inventor:
Gelston Sanford

UNITED STATES PATENT OFFICE.

GELSTON SANFORD, OF POUGHKEEPSIE, NEW YORK.

HORSE-POWER MACHINE.

Specification of Letters Patent No. 25,528, dated September 20, 1859.

*To all whom it may concern:*

Be it known that I, GELSTON SANFORD, of Poughkeepsie, in the county of Dutchess and State of New York, have invented certain new and useful Improvements in Horse-Powers; and I do hereby declare that the following is a full and exact description of the same, reference being had to the accompanying drawings, and to the letters of reference marked thereon, in which—

Figure 1 is a longitudinal vertical section, and Fig. 2 a transverse vertical section of the machine.

The object of my invention is to make a horse power that shall possess the full power and capacity of any other machine for the same purpose, while it occupies a much less amount of floor or ground room; and that shall elevate the driving pulleys to a sufficient height above the floor or ground to be above and out of the way of the operator of the machine; and to enable them to be used at any desired angle to the line of the bed of the machine; and my invention consists, 1st, in arranging and combining a pair of internal-toothed wheels and their pinions in such relation to each other as to make the driving gear occupy a less amount of space upon the floor or ground than is required for other machines of like kind where the same amount of speed of the driving pulleys is attained; 2d, in elevating the driving pulleys to a height that places them above and out of the way of the operator, by elevating the driving shaft on a hollow standard; and 3d in making the line of the driving shaft adjustable to any required angle to the line of the bed of the machine, so that the machine can be employed to operate different machines placed in different positions, without changing the position of the bed of the horse power.

A is the bed of the machine, which can be securely fastened to a barn or other floor or to the ground.

B is a hollow standard, secured at its bottom end to the bed A, and made of such height as to place the driving shaft of the machine at an elevation sufficient to put the pulleys upon it above, and out of the way of the operator or other persons about the machine.

C is the main gear wheel, running at the bottom of its hub upon friction bearings to relieve and lessen the friction due to its weight, and confined at the top of its hub by a collar upon the hollow standard B, upon which standard it is fitted and revolves. It is toothed on the interior of its rim, and gears into the pinion D secured to the shaft E, upon the lower end of which shaft is secured the internal toothed wheel F similar in construction to the wheel C. The shaft E is supported upon a friction bearing, similar to that used for the wheel C, and for the same purpose.

G is a pinion gearing into the wheel F, and attached to the shaft H running in, and through the hollow standard B.

To the upper end of the shaft H is secured the bevel wheel I, gearing into the pinion J upon the shaft K; the latter shaft having upon it the driving pulleys L, L', and being secured in suitable boxes to the frame or bearing M which can be rotated on the upper end of the hollow standard B to bring the driving shaft to any desired angle to the line of the bed A, and can be secured in its desired position by a set-screw in it bearing upon and against the standard B.

The relative proportions of the several wheels and pinions described are such as to produce the requisite speed of the driving pulleys L, L', and the speed of the periphery of those pulleys may be increased or diminished by changing the relative proportions of the wheels and pinions, or by increasing or diminishing the diameter of the pulleys. By this combination and arrangement of the internal-toothed wheels and pinions the proper speed to be given to the driving pulleys is attained within a space equal to one and a half times the diameter of the main driving wheel, so that the machine occupies a much more compact space than the ordinary sweep horse-power; while the elevation of the driving pulleys, and the facility with which they can be set at different angles to the bed of the machine to operate differently placed machines without changing the position of the machines or of the horse power gives it an advantage over other machines now used for the same purpose.

What I claim as my invention and desire to secure by Letters Patent is—

1. The combination of the internal-toothed wheels C and F and their connected pinions, with the hollow standard B, when arranged in the manner, and for the purpose set forth.

2. The combination of the hollow standard B with the shaft K, and its connected gearing I and J, in the manner, and for the purpose described.

3. The combination of the adjustable bearing or frame M with the hollow standard B and shaft K, as, and for the purpose set forth.

GELSTON SANFORD.

Witnesses:
 THOMAS FINN,
 M. HASKELL.